United States Patent [19]

Gelber

[11] 4,070,097
[45] Jan. 24, 1978

[54] OPHTHALMIC ANTIREFLECTION COATINGS WITH METAL, DIELECTRIC, SUBSTRATE, METAL, DIELECTRIC IN SEQUENCE

[75] Inventor: Robert M. Gelber, Healdsburg, Calif.

[73] Assignee: Optical Coating Laboratory, Inc., Santa Rosa, Calif.

[21] Appl. No.: 739,478

[22] Filed: Nov. 8, 1976

Related U.S. Application Data

[63] Continuation of Ser. No. 540,793, Jan. 14, 1975, abandoned.

[51] Int. Cl.² .................................................. G02B 1/10
[52] U.S. Cl. ....................................... 350/165; 351/44
[58] Field of Search ............... 350/164, 165, 166, 163, 350/314, 2; 428/432, 433; 427/164–168; 351/44

[56] References Cited

U.S. PATENT DOCUMENTS

| | | | |
|---|---|---|---|
| 3,330,681 | 7/1967 | Scharf et al. | 350/165 |
| 3,679,291 | 7/1972 | Apfel et al. | 350/164 |
| 3,936,579 | 2/1976 | Ogasawara et al. | 350/164 |

*Primary Examiner*—Jon W. Henry
*Attorney, Agent, or Firm*—Flehr, Hohbach, Test, Albritton & Herbert

[57] ABSTRACT

Ophthalmic anti-reflection coating for use on spectacles with lenses having an eye side and an outside. A first coating is disposed on the eye side of each lens and the second coating is disposed on the outside of each lens. The first and second coatings are formed of a metal layer and a dielectric layer having a low index of refraction. The metal layer in the first coating is adjacent the lens on the eye side and the dielectric layer in the second coating is adjacent the lens on the outside.

10 Claims, 11 Drawing Figures

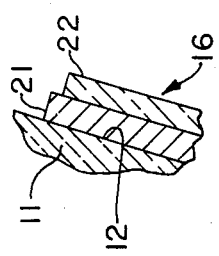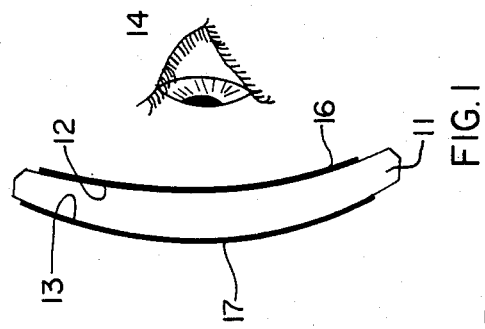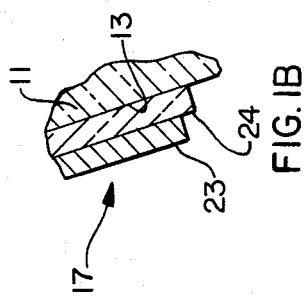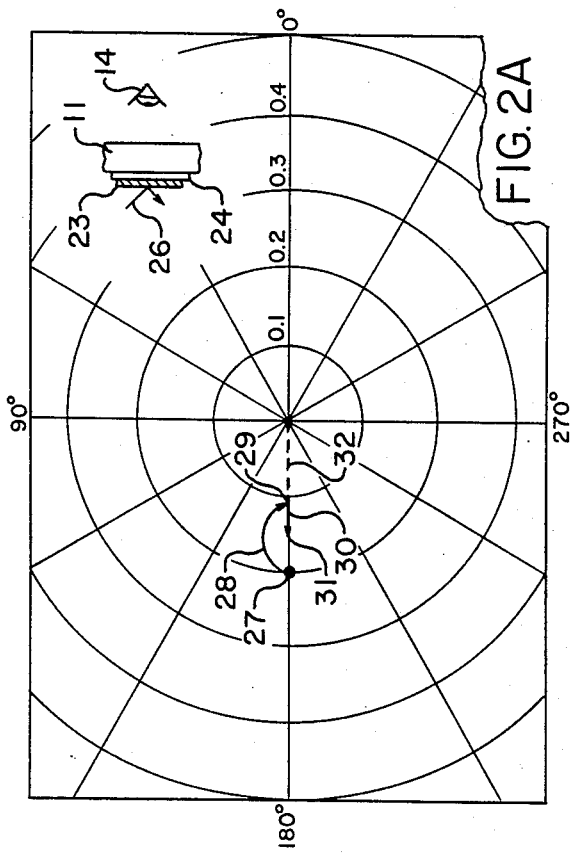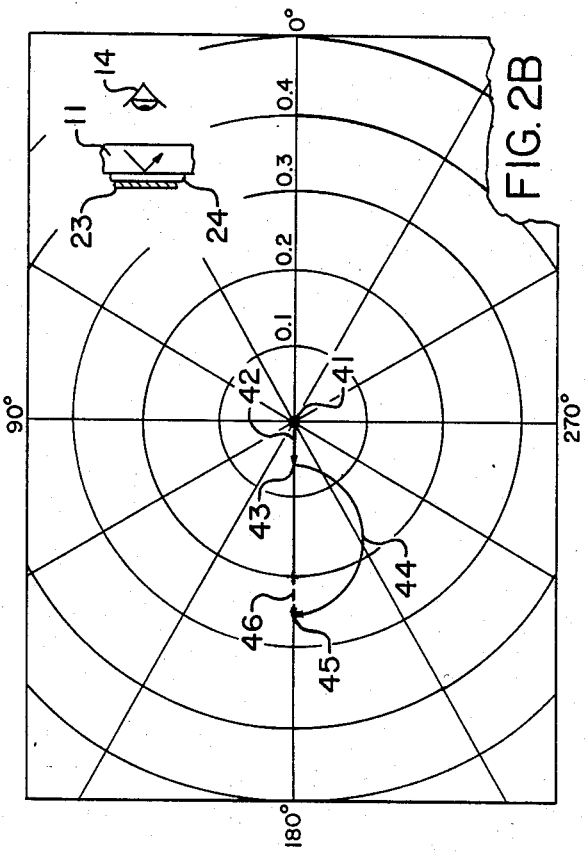

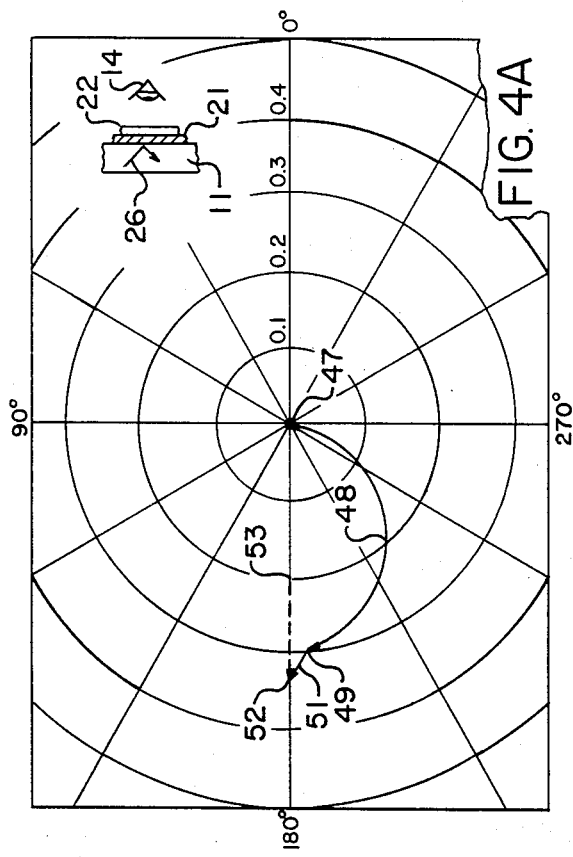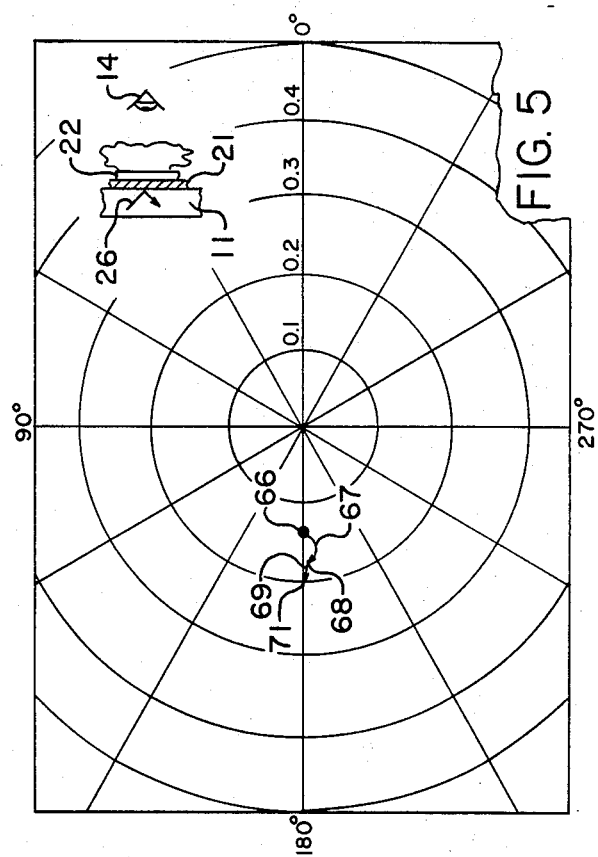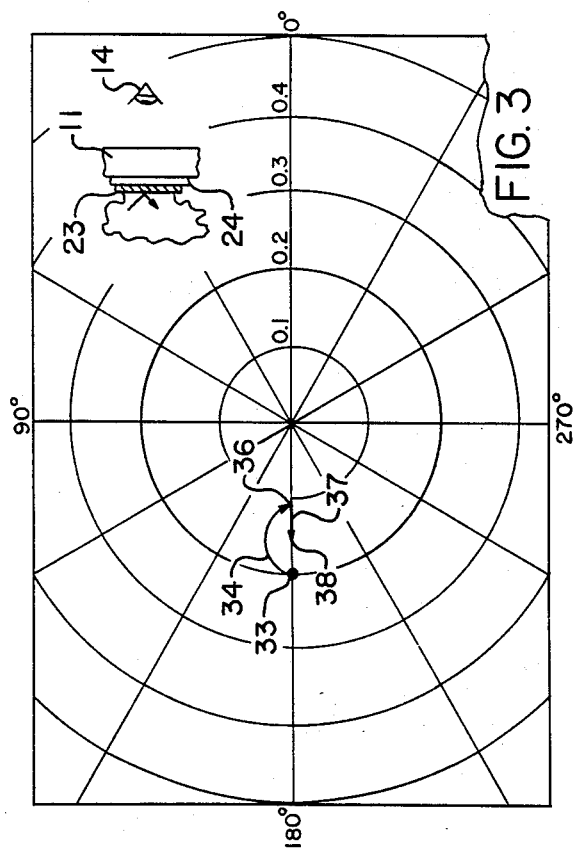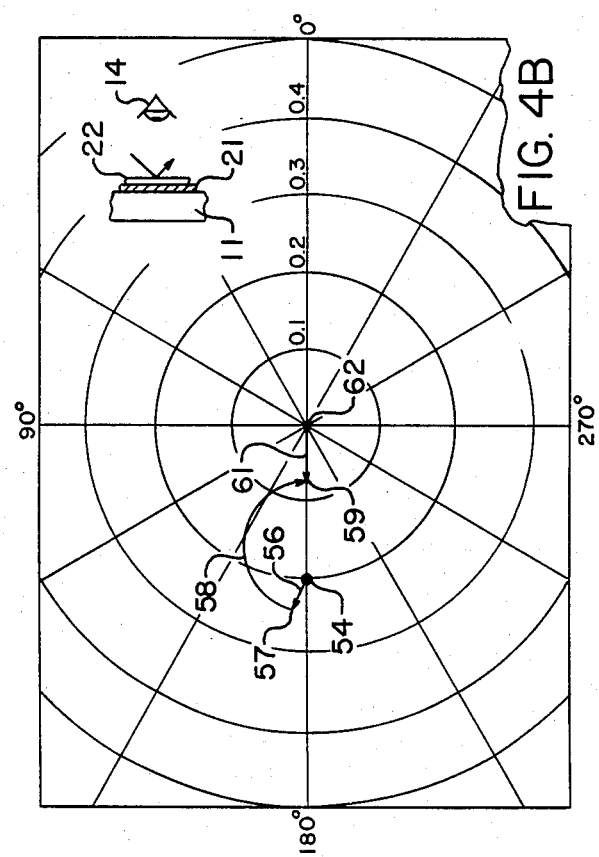

OPHTHALMIC ANTIREFLECTION COATINGS WITH METAL, DIELECTRIC, SUBSTRATE, METAL, DIELECTRIC IN SEQUENCE

This is a continuation of application Ser. No. 540,793 filed Jan. 14, 1975 and now abandoned.

BACKGROUND OF THE INVENTION

Anti-reflection coatings heretofore have been provided on clear spectacle lenses to improve visibility for the wearer of the spectacles. However, generally, such anti-reflection coatings have been formed of a single layer of magnesium fluoride ($MgF_2$). Other coatings have also been utilized in anti-reflection coatings on spectacle lenses; for example, a coating such as described in U.S. Pat. No. 3,185,020 has been used very satisfactorily for such a purpose. However, it has been found that such a coating has a propensity to show fingerprints and stains. The reason that anti-reflection coatings made in accordance with U.S. Pat. No. 3,185,020 shows stains and fingerprints can be readily appreciated when it is considered that such an anti-reflection coating was designed to match the substrate which is glass having an index of 1.52 to a medium which is air having an index of 1.0. The anti-reflection coating matches these two indices and eliminates reflection. However, when a fingerprint is placed on the anti-reflection coating, the medium instead of air is now the fingerprint mark or stain which is essentially an oil having an index of refraction in the vicinity of 1.33. The anti-reflection coating of U.S. Pat. No. 3,185,020 does not work well under such an index and therefore the reflection goes up from essentially zero to approximately 3% so that there is a very high background-to-stain ratio, which makes the fingerprint stain very obvious. There is therefore a need for a new, improved anti-reflection coating which can be utilized on spectacle lenses.

SUMMARY OF THE INVENTION AND OBJECTS

An ophthalmic anti-reflection coating for use on spectacles with lenses having an eye side and an outside consisting of a first coating disposed on the eye side of the lens and a second coating disposed on the outside of the lens. The first and second coatings are formed of a metal layer and a dielectric layer having a low index of refraction. The metal layer is adjacent the lens on the eye side of the eye glass and the dielectric layer is adjacent the lens on the outside. The metal which is used has a reflectance over the visual region and is relatively neutral in color. The metal layer is of a type which can be deposited in thin layers. The dielectric layer has a low index of refraction.

In general, it is an object of the present invention to provide an anti-reflection coating for spectacles or eye glasses on which fingerprints and stains are relatively invisible.

Another object of the invention is to provide a coating of the above character which has a low reflection on both the outside and the inside surfaces of the lenses of the spectacles.

Another object of the invention is to provide a coating of the above character in which a coating is provided on both the eye side and the outside of the spectacle lenses.

Another object of the invention is to provide a coating of the above character in which the same materials are utilized for the coatings on the eye side and the outside of the lenses.

Another object of the invention is to provide a coating of the above character which is substantially asymmetric and which has a low back surface reflection and in which the front surface reflection is the same with or without a fingerprint.

Another object of the invention is to provide a coating of the above character which is relatively simple and which can be readily used on ophthalmic lenses.

Another object of the invention is to provide a coating of the above character which is designed so that when the medium changes within a certain predetermined range, the reflection remains relatively constant or decreases.

Additional objects of the invention will appear from the following description in which the preferred embodiments are set forth in detail in conjunction with the accompanying drawings.

BRIEF DESCRIPTION OF THE DRAWINGS

FIG. 1 is a view of a spectacle lens having ophthalmic anti-reflection coatings of the present invention disposed on the "eye side" and the outside surfaces of the spectacle lenses.

FIGS. 1A and 1B are enlarged partial cross-sectional views of FIG. 1 showing the "eye side" and "outside" coatings respectively.

FIGS. 2A, 2B, 3, 4A, 4B, and 5 are circle diagrams illustrating the theoretical performance of the ophthalmic anti-reflection coatings utilized in connection with the present invention.

DESCRIPTION OF THE PREFERRED EMBODIMENTS

Figure 6:
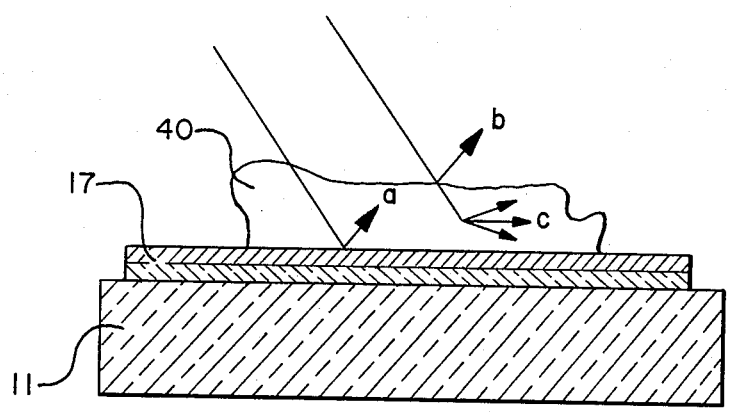
FIG. 6 is a cross-sectional view showing the reasons why fingerprint stain is visible on a spectacle lens.

The ophthalmic anti-reflection coating for use on eye glasses or spectacles is shown in FIG. 1. The spectacles have substantially transparent lenses with first and second surfaces 12 and 13 with the surface 12 being an inside or "eye side" surface facing the eye 14 whereas the surface 13 is an outside surface which faces the medium. Typically the lens is formed of substantially transparent glass having an index of refraction of 1.52.

Coatings 16 and 17 are provided on the surfaces 12 and 13 and each is comprised of at least two layers. Coating 16 is provided with at least two layers 21 and 22 and coating 17 is provided with at least two layers 24 and 24. The coatings 16 and 17 have a two layer design utilizing a dielectric and a metal. Because of the asymmetric feature of the coating as hereinafter explained, the layer order is not the same on the front and back surfaces of the lenses. As can be seen from FIG. 1, the dielectric layer faces the wearer's eyes on both surfaces whereas the metal layer is on the outside of each coating facing away from the wearer's eyes in both cases.

The metal layer has a reflectance over the visual region. It should have a relatively neutral color or, in other words, is neutral in transmission. The metal layer can be formed of any suitable material such as nickel, chromium, Inconel and Nichrome (a material comprised of essentially nickel and chromium). It is necessary that the material is one which has a substantially neutral transmission and which can be deposited in extremely thin layers. At the present time, silver and aluminum are not suitable materials because they cannot be deposited in reproducible extremely thin layers. Typically the metal layers can have a thickness ranging from 10 to 40 Angstroms.

The metal layer is important in the present design in that it makes the coating asymmetric, that is, the reflection from the inside is not the same as from the outside. This can only be accomplished with an absorbing material, and it cannot be accomplished with non-absorbing dielectric materials which have the same reflection on the inside and the outside.

A low index dielectric material is utilized for the dielectric layer. The most suitable dielectric is magnesium fluoride which has a low index of refraction of 1.38. Another material which can be used although it does not have as low an index of refraction is silicon dioxide ($SiO_2$) which has an index of refraction of 1.45. It, however, has an additional advantage in that it can be sputtered to make a more durable coating. Cryolite also can be utilized because it has an index of refraction of approximately 1.4 but it would not be nearly as satisfactory as magnesium fluoride or silicon dioxide. The dielectric layer has a suitable thickness such as a one-quarter wave length at the design wave length of 550 nanometers. This thickness can be varied ± 30% while still achieving satisfactory results.

Because of the asymmetric features of the coating, the layer order of the coatings 16 and 17 is not the same on the front and back surfaces of the lens. As can be seen in the outside coatings 17, the magnesium fluoride layer 24 is in contact with the outside surface 13 whereas in the inside coating 16 the metal layer 21 is in contact with the inside surface 12. Stated in another way, the magnesium fluoride layer in both coatings faces the wearer's eyes whereas the metal layer is on the other side facing away from the wearer for both cases.

The performance of the coatings shown in FIG. 1 can be seen in FIGS. 2A, 2B, FIG. 3, FIGS. 4A, 4B, and FIG. 5. These diagrams are called circle diagrams and can be used to describe the performance of thin film optical multilayers. They were described by Apfel in Applied Optics, 11 p. 1303. In each of these latter figures, there is provided a little insert representing the performance which is being analyzed. Thus, as shown in FIG. 4A, the performance of the eye side coating 16 is being analyzed as seen from the outside as represented by the arrow 26. The circle diagram represents the manner in which the coating works or would appear to someone on the outside who is not wearing the glasses and is looking at the wearer of the glasses. In FIG. 4A it is assumed that the medium is air having an index of refraction of 1.0 whereas in FIG. 5 is it assumed that the medium is a fingerprint having a index of refraction of approximately 1.33.

Even though one is looking at the lends or eye glass from the outside in considering the circle diagrams, it should be determined what the coating is being matched into. Thus, for example, where the coating 17 is being matched into the air, one analyzes the coating in the circle diagram by determining how the various layers of the coating match into glass. As shown in FIG. 2A one starts at the point 27 which represents a reflectance of 0.2 for glass having an index of refraction of 1.52. Starting from this point 27, the first layer which is encountered is the magnesium flouride layer 24, which is represented by the arrow 28 starting from the point 27, which is a quarter-wave optical thickness to end up at a point 29. The metal layer 23 which is next encountered is represented by the arrow 31 which is a small straight arrow starting from the point 29 and facing away in a direction from the origin. The metal layer is of sufficient thickness so that the arrow 30 has a length so that it moves away from the origin to a point 31. The reflectance from air is determined by determining the length of the broken-line arrow 32 from the origin to the point 31. The length of this arrow is approximately 0.141. Squaring this value gives a value of 0.02 for the reflection in air which is equal to 2%. A quarter wave layer of magnesium fluoride is deposited to obtain the phase shaft in order to provide a low reflectance with respect to the inside of the lens or eye glass 11.

Now turning to the circle diagram shown in FIG. 3, the starting place is at point 33 which is from glass at 0.2. The first layer encountered is the magnesium fluoride layer 24 which is represented by the arrow 34 extending through 180° and ending at point 36. The metal layer 23 is next encountered and is represented by the straight arrow 37 which commences from the point 36 and extends away from the origin for a distance to point 38 to a value of 0.16. The reflectance of this coating in a 1.33 medium is determined by the length of the vector from the amplitude reflectance of the medium to the point 38. The amplitude reflectance of a 1.33 medium is 0.14 and 180° phase shift. The length of the vector is 0.02, which when squared is 0.0004 or 0.04%.

Now examining FIG. 2B the performance of the outside coating is analyzed as seen from the eye side. In the drawing of a circle diagram one starts at the origin represented by the point 41 which is from air. The first coating which is encountered is the metal layer 23 which is represented by the straight arrow 42 commencing at the point or origin 41 and ending at the point 43. Next one encounters the magnesium fluoride coating 24 which is represented by the arrow 44 which starts from point 43 and goes through a 180° arc to end up at the point 45 which is at 0.25. The reflectance from glass is determined by taking the length of the broken-line arrow 46 which starts from 0.20 to point 45. The length of this broken line arrow 46 is therefore 0.05 and squaring this gives us a value of 0.0025 which when converted to percentage gives a value of 0.25% which is the reflectance in glass. This is a very low value of reflectance and is very satisfactory.

Next turning to FIG. 4A the performance of the eye side coating 16 as seen from the outside is analyzed. Starting from air which is represented by the origin 47 the first layer which is encountered is the magnesium fluoride layer 22 which is represented by the arrow 48 commencing from the origin 47 extending through almost a 180° arc to a point 49. The metal layer 21 which is next encountered is represented by the short straight arrow 51 commencing at the point 49 and ending at the point 52. The distance from the point 52 and a point 53 which represents the reflectance from glass is a distance of approximately 0.145 which when squared gives a value of 0.02 which is equal to the reflectance of 2% in glass.

In FIG. 4B the performance of the eye side coating as seen from the eye side is analyzed. Again, the circle diagram is commenced by starting from the glass as represented by the point 54. The first layer encountered is the metal layer 21 which is represented by the straight arrow 56 terminating at point 57. Thereafter, the magnesium fluoride layer is encountered which is represented by the arrow 58 commencing at point 57 and extending through almost 180° arc to end at the point 59. The measure of the reflectance from air to glass is obtained by taking the length of the arrow 61 from the origin 62 representing air to the point 59. This arrow 61 has a length of approximately 0.07 which when squared gives a value of 0.005 which is equivalent to 0.5%.

In FIG. 5, the performance of the eye side coating as seen from the outside immersed in a fingerprint or stain having an index of refraction of 1.33 is shown. In drawing the circle diagram one starts at the point 66 which represents the 1.33 index of refraction. The first layer that is encountered is the magnesium fluoride layer 22 which is represented by the arrow 67 starting at a point 66 and going through almost 180° arc to end at point 68. The metal layer 21 is next encountered which is represented by the arrow 69 terminating at point 71. As can be seen this point 71 ends up at substantially the reflectance of glass so that the reference of the coating into the glass is approximately 0.05%.

As shown in FIG. 6, fingerprints and similar stains represented as 40 are visible on an anti-reflection coating such as the coating 17 on the surface of substrate 11 due to:

a. reflection at fingerprint/substrate interface,
b. reflection at fingerprint/air interface,
c. scattering within the fingerprint.

The arrows carrying the designation a, b, and c identify the effects above. The "visibility" of the fingerprints will be related to the change in the reflectance from the clean surface to the total contribution of a, b, and c above. Assuming the fingerprint has a negligible absorption and an index of refraction of approximately 1.33, the reflection at the fingerprint/coating interface depends on the coating design. The scattering depends upon the lighting conditions and in addition will vary from stain to stain. Assuming that scattering is not a major contributing factor, the fingerprint visibility is related to the reflectance change at the coating surface and the addition of a 2% reflectance from the top surface of the fingerprint. The Table I below compares fingerprint visibility on uncoated glass, single layer magnesium fluoride (MgF$_2$) and HEA (the coating disclosed in U.S. Pat. No. 3,185,020. The visibility is defined as:

$$V = (R_{clear} - R_{stain})/(R_{clear} + R_{stain})$$

Where $R$ is the total reflection seen by the viewer.

TABLE I

| Coating | Reflectance* | | | | Visibility |
|---|---|---|---|---|---|
| | $R_{clear}$ | $R_{n=1.33}$ | $R_{top}$ | $R_{stain}$ | |
| Uncoated | 4.24 | 0.43 | 2.00 | 2.43 | 0.27 |
| MgF$_2$ | 1.4 | 0.15 | 2.00 | 2.15 | 0.21 |
| HEA | 0.15 | 1.75 | 2.00 | 3.75 | 0.92 |

*Reflectance is average visual, in percent.
$R_{stain} = R_{top} + R_{n=1.33}$

From Table I it can be seen that the visibility of a fingerprint or stain on an HEA coating is about 3.5 times worse than on glass and 4.5 times worse than on magnesium fluoride.

In summary, FIGS. 2A and 2B illustrate the design performance of the coating 17 on the outside surface. The thickness of the nichrome or magnesium fluoride layers is chosen to give approximately 2% reflection in the air and as low a reflection as possible into the substrate. FIG. 3 illustrates the same design immersed in an $n = 1.33$ fingerprint. It should be noted that from the outside the reflectance goes towards zero at the fingerprint/coating interface. From the "eye side" the reflectance goes from 0.25 to 0.50% at the coating/substrate interface.

In summary, the performance of the coating 16 on the "eye side" or inside surface is shown in FIGS. 4A and 4B. The magnesium fluoride and Nichrome layer thicknesses were chosen for the best possible combination of low reflection and low fingerprint visibility. From the outside the reflectance is 2% and from the eye side it is 0.5%. FIG. 5 shows the change in reflectance with the addition of a fingerprint with an index of $n = 1.33$ on the coating. The reflectance of the coating/substrate interface goes to 0.05% while at the coating/fingerprint interface it goes to 0.5%.

A summary of these reflectance values and the changes are shown in the following Table II.

TABLE II

| Coating | Viewed From | Reflectance* | | | Visibility |
|---|---|---|---|---|---|
| | | $R_{clear}$ | $R_{n=1.33}$ | $R_{stain}$ | |
| Eye side (E-S) | E-S | 0.75 | 0.55 | 2.55 | 0.62 |
| | O-S | 2.10 | 0.05 | 2.05 | 0.01 |
| Out side (O-S) | E-S | 0.40 | 0.55 | 2.55 | 0.73 |
| | O-S | 2.70 | 0.20 | 2.20 | 0.10 |

*Reflectance is average visual, in percent.

Table II shows that fingerprint visibility is low on the outside which is the desired result. However, it is not as low on the "eye side" because by definition it cannot be if it is a good anti-reflection coating.

Table III below compares fingerprint visibility for the coating of the present invention identified as opthalmic AR and the coatings previously discussed.

TABLE III

| Coating | Fingerprint Visibility* | |
|---|---|---|
| | One surface stained | Two surfaces stained |
| HEA | 0.86 | 0.92 |
| MgF$_2$ | 0.12 | 0.21 |
| Uncoated | 0.12 | 0.27 |
| Opthalmic-AR | | 0.06 |
| Eye side | 0.005 | |
| Out side | 0.05 | |

*Visibility calculated for both surface contributions, from outside spectacles.

Whereas the magnesium fluoride and uncoated glass are approximately 7 times better than HEA insofar as staining is concerned, the coating of the present invention is from 17 to 170 times better insofar as staining is concerned depending upon where the fingerprint or stain is located.

Figure 7:
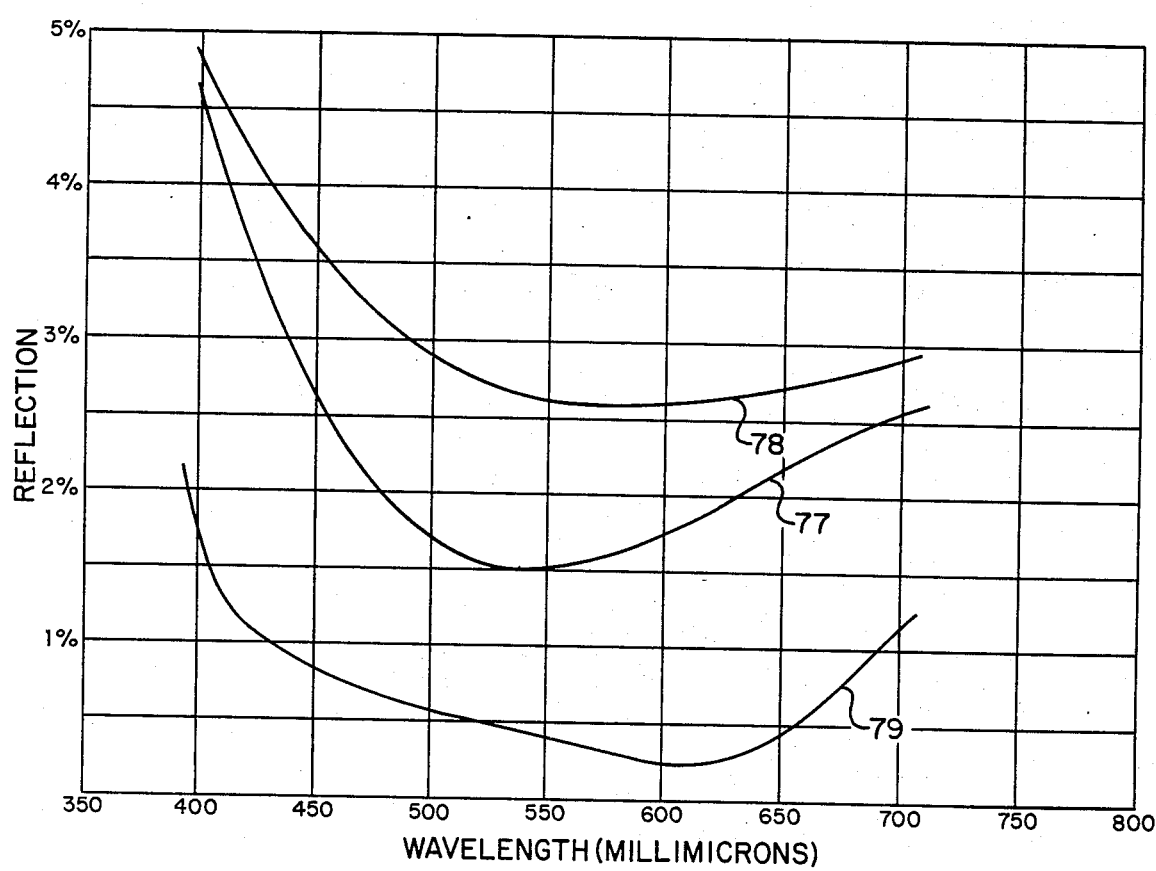
FIG. 7 is a graph showing the spectral performance of an HEA coating, the ophthalmic anti-reflection coating of the present invention, and a simple magnesium fluoride coating.

While the stain or fingerprint resistance of the coating of the present invention is substantially better than both the HEA and the magnesium fluoride, the spectral performance lies in between them. This is shown in FIG. 7 in which there are three curves 76, 78 and 79 in which the curve 79 is for the HEA coating, curve 77 is for the asymmetric two-layer opthalmic anti-reflection coating of the present invention as viewed from the eye side and curve 78 is for the magnesium fluoride. These are measured curves from actual samples.

From the foregoing it can be seen that there has been provided an opthalmic anti-reflection coating which is asymmetric and which has two important properties: (a) back surface reflection is as low as possible and (b) front surface reflection is the same with and without a fingerprint.

It is obvious that the ideal coating would have a very low reflection on both surfaces. However, it is impossible to have a coating with a 2% reflection needed to make a fingerprint substantially invisible and at the same time have less than 2% reflection. A compromise must thus be struck so that the fingerprint will be invisible on the front surface but will not be quite invisible on the back surface. At the same time, there will be low reflection on the back surface where it is required for a good eye glass or spectacle performance.

The circle diagrams hereinbefore described also make it apparent that the use of a metal layer is required because as is known to those skilled in the art, the dielectrics go in circles whereas the metal layers go essentially in straight lines. From the circle diagrams it is apparent that to go from one point to the next desired point only a metal can be used which is represented by a substantially straight line.

Although the present invention has been discussed in connection with glass spectacles or eye glasses, it can be appreciated that it is also applicable to plastic lenses particularly for the eye side coating because in this case the metal layer is next to the substrate which when formed of plastic would bond very satisfactorily to the plastic. However, not as good a bond would be achieved with respect to the outside coating in which the dielectric layer would be next to the substrate.

As explained previously, the layer order is reversed so that the metal layer is always on the outside away from the eye side because that is the side that is to be matched into the fingerprints. In other words, it is desired to always see a 2% reflection when looking from the outside of the spectacles.

If it is assumed that the fingerprints would only be present on the outside of the eye glasses, it is possible to merely provide only the one coating 17 of the present invention on the outside surface and to utilize another anti-reflection coating such as conventional HEA on the inside surface. This would improve the anti-reflection characteristics of the eye glasses.

In comparing eye glasses with camera lenses, it should be appreciated that the image and the "noise" (ghosting) are both coming from the same side of the lens in a camera lens system whereas in an eye glass or spectacle the noise comes from the back side of the spectacle lens and the image comes from the front side. It is for this reason that low reflection is not required on both sides of the eye glasses.

In a series of runs utilizing the present invention on eye glasses, it has been found that the opthalmic anti-reflection coating of the present invention works very satisfactorily. It was found that the measured reflectance agrees very well with predicted reflectance. Measured transmission was approximately 85% with two surfaces coated.

In a side-by-side comparison of eye glasses having coatings of the present invention and HEA and magnesium fluoride coatings it was not readily apparent that there was absorption in the lenses or glasses having coatings of the present invention, even though thin metal layers were used. It was found that in runs with the lowest transmission there was only a very slight gray tint which could be an advantage or disadvantage depending on the wearer's taste. In comparing the back side reflection HEA had the lowest, the ophthalmic anti-reflection coating of the present invention was next, magnesium fluoride was next and uncoated had the highest. In wearing glasses with the various coatings one could notice the difference between the magnesium fluoride and the HEA but the difference between the ophthalmic anti-reflection coating of the present invention and HEA was not apparent. It was found that there was a very distinct difference in the fingerprint visibility between the ophthalmic anti-reflection coating of the present invention and the other coatings from the outside. It was found that the fingerprints with the ophthalmic anti-reflection coating were substantially invisible from the outside. From the eye side there was a small improvement over HEA.

I claim:

1. An ophthalmic anti-reflection coating structure for use on spectacles for the eyes of a wearer having at least one lens comprised of a convex surface and a concave surface having a first coating on the convex surface and a second coating on the concave surface, each coating surface and a second concave surface consisting of a metal layer and a dielectric layer having a low index of refraction in the range of 1.38 to 1.45, the reflection of each coating being asymmetric on opposite sides and being lower than the transmission on both sides the metal layer being nearer the convex surface than the dielectric layer on the convex surface and the dielectric layer being nearer the concave surface than the metal layer on the concave surface.

2. A coating as in claim 1 wherein said metal is a material comprised essentially of nickel and chromium and wherein said dielectric is magnesium fluoride.

3. A coating as in claim 1 wherein said dielectric layer has a substantially quarter wave optical thickness at the design wave length at approximately 550 nanometers.

4. A coating as in claim 1 wherein said metal layer has a thickness ranging from 10 to 40 Angstroms.

5. A coating as in claim 1 wherein the transmissivity of the lens with coatings on the first and second surface is in the vicinity of approximately 85%.

6. A spectacle for the eyes of a wearer comprising a glass substrate having a first concave and a second convex surface, a first coating disposed on said first surface and a second coating disposed on said second surface, said first and second coatings each consisting of a relatively thin metal layer having a thickness of approximately 10–40 nanometers and a dielectric layer having a low index of refraction in the vicinity of 1.38 to 1.45, said metal layer of the first coating being adjacent the first surface and said metal layer of the second coating being remote from the second surface, each of the first and second coatings being asymmetric by reflection on opposite sides and having a reflection which is low in comparison to the transmission.

7. A spectacle as in claim 6 wherein said dielectric layer is formed of magnesium fluoride having a thickness of approximately one quarter of the design wave length of approximately 550 nanometers of the coating.

8. A spectacle as in claim 6 wherein said metal is a material comprising essentially nickel and chromium having a thickness ranging from 10 to 40 Angstroms.

9. A spectacle as in claim 6 wherein the substrate with the first and second coatings disposed on the first and second surfaces has a transmissivity in the vicinity of approximately 85%.

10. An article of manufacture comprising a substrate having a first concave surface and a second convex surface, a first coating disposed on said first surface and a second coating disposed on said second surface, said first and second coatings each consisting of a relatively thin metal layer and a dielectric layer having a low index of refraction in the vicinity of 1.38 to 1.45, said metal layer of the first coating being adjacent the first surface and the metal layer of the second coating being remote from the second surface, each of the first and second surfaces with the first and second coatings thereon being asymmetric by reflection on opposite sides and having a reflection which is low in comparison to the transmission said coatings providing a combined fingerprint visibility as viewed from outside the convex surface of less than approximately 0.06.

* * * * *